INVENTORS
ROBERT K. HOFFMAN
JERRY L. BALDWIN
DENNIS D. MAC FARLANE
JOHN VANDER HORST

BY Sheridan and Ross

ATTORNEYS

United States Patent Office 3,418,789
Patented Dec. 31, 1968

3,418,789
AUTOMATIC LIQUID DISCHARGE MECHANISM
Robert K. Hoffman and Jerry L. Baldwin, Littleton,
Dennis D. MacFarlane, Lakewood, and John Vander
Horst, Englewood, Colo., assignors to C. A. Norgren
Co., Littleton, Colo., a corporation of Colorado
Filed Aug. 30, 1965, Ser. No. 483,397
11 Claims. (Cl. 55—219)

ABSTRACT OF THE DISCLOSURE

An automatic drain system including a servomechanism operatively connected to a float and a liquid discharge valve. The servomechanism including a reciprocable piston which moves the discharge valve downwardly to discharge liquid.

This invention lies in the general field of separation of foreign matter, especially liquid, from a compressed gas system and the discharge of the undesired liquid. More particularly, it relates to a novel mechanism for receiving and storing undesired liquid and automatically discharging the liquid to waste as it accumulates beyond a predetermined maximum quantity.

The use of a filter or separator in a compressed gas system, such as the compressed air lines widely used in industry, eliminates the nuisance of moisture and dirt in the air line and materially lengthens the life of air tools, cylinders, and other air-operated equipment. Rust and corrosion is greatly reduced by removing the moisture, oil emulsions, and condensed liquids from the compressed air. Removal of abrasive solids, such as grit, scale, pipe dope, etc., also greatly reduces the wear on the air equipment.

There are various devices present in use for such purposes and, in general, they operate quite satisfactorily. A common type is inserted in series in an air line through which pressurized air passes from a pump or pressure storage reservoir to a tool to be operated by the air. The device is so formed internally that the air passing through it is subjected to a whirling action which throws liquid and solid contaminants out against the walls by centrifugal force, after which the air passes through a screen or filter to remove any remaining solid matter and then out to the continuation of the air line. The liquid matter gravitates to the bottom of an attached container, and when a substantial amount has accumulated a drain valve is opened to discharge it to waste.

The rate of accumulation is often irregular and thus the storage containers must be checked frequently for, if the level rises too high, the liquid will be picked up again by the air and passed on through the line. This difficulty is overcome by placing a float in the container which is arranged to open the drain valve when the float rises to a predetermined height and to close the valve again when the float falls to another predetermined height. When the pressure is very low a float can be used to operate the valve directly, but at high pressures, such as 100 p.s.i. and over, the force necessary to open the valve requires a float of excessive size for direct operation and this is not satisfactory, especialy if space is at a premium. Therefore a servo motor is used to operate the valve. It is usually powered by the pressurized air of the system, and the float acts to open and close a valve which allows such air to flow to the servo motor.

A very successful mechanism of this type, which has been used for many years, is disclosed and claimed in U.S. Patent No. 2,726,732, issued to Faust and Wilson on Dec. 13, 1955. In the device shown in the patent, a first, upper body is connected directly in an air line and air passing through it is centrifuged to remove solid and liquid contaminants. A second, lower body in the form of an upright container is secured to the first body in sealing relation and is subject to the pressure of the system. A discharge mechanism including a drain valve is secured in the bottom of the container and a float is located directly above it and guided by an upward extension of the discharge mechanism.

The mechanism generally comprises a hollow body with a drain valve in its lower portion communicating with the ambient atmosphere, and a diaphragm dividing the upper portion into upper and lower compartments. The upper compartment is open to atmosphere at all times through a substantial conduit. The lower compartment has a small bleed passage leading to atmosphere and a much larger supply passage leading to an inlet port at the upper end of the extension mentioned above, at a point well above the maximum allowable level of the accumulated liquid. The float carries a valve which closes the inlet port at low water level and opens it when the float rises, to permit pressurized air to enter the lower compartment. Pressure builds up in the lower compartment until it is sufficient to overcome the force holding the drain valve closed, whereupon the drain valve opens to discharge liquid to waste. When the float lowers and closes the inlet port, the bleed passage discharges air from the lower compartment and the drain valve again closes.

While the patented device is superior to other devices for the same purpose presently being used, it has several shortcomings which call for improvements. At the completion of a discharge cycle the lower, or servo, compartment goes back to atmospheric pressure, while the full force of the system pressure holds the drain valve tightly closed. When the next discharge cycle is to take place, the float opens the inlet port and enough air must enter to come up to system pressure and overcome the closing force on the drain valve. This delays the operation, and a substantial quantity of system air is dissipated for each cycle.

Since the servo compartment is normally at atmospheric pressure, the differential across the gas inlet port becomes very substantial at high pressures and a relatively large float is required to unseat the valve. Therefore the total device cannot be made as compact as desired. When the system is shut down, as at the end of a work day, the pressure is normally cut off and the device cannot operate to drain the liquid which may be accumulated in the container. While this is not critical, it is desirable to have a mechanism which is self draining in the absence of system pressure.

The present invention overcomes all of the difficulties mentioned above and has various features which combine to make possible an extremely small and compact device which is at the same time highly reliable and simple to manufacture and maintain. Generally stated, in its presently preferred form it comprises a servo unit having a main valve body enclosing a chamber, and a movable partition in the chamber dividing it into first and second compartments, the partition being connected to a drain valve to open and close it at appropriate times. It is preferably mounted in a container as in the Faust and Wilson patent, but this is not essential, and it is actuated by the pressure in the system. The principal use of devices of this kind is to purify compressed air but they work equally well with any fluid such as other gases or steam, and the term "gas" as used herein is meant to include other fluids normally used in industry.

When the device is mounted in the container for accumulated liquid, it is located in the bottom and is normally covered by the liquid. The first compartment has an inlet port, or a plurality of them, always open to the pressurized liquid in the container. The second compartment has a gas inlet port communicating with it to receive pressurized gas from the container. A float, located above the valve body, carries a cap or valve for closing the gas inlet port at low liquid levels and opening it at high liquid levels. When the gas inlet port is held open, the gas in the second compartment reaches a pressure level which approaches or is substantially equal to that of the liquid in the first compartment.

In the preferred construction, the partition has a stem extending axially through the first compartment to actuate the drain valve. Hence the effective area of the partition on the second compartment side is somewhat larger than on the first compartment side. In addition, the preferred construction employs a spring under compression between the partition and the end wall of the second compartment which adds its force to the second compartment pressure.

Thus when sufficient gas enters the second compartment of a pressure level substantially equal to the pressure in the first compartment such force, plus that created by said effective area differential and the spring, results in the resistance of the liquid pressure in the first compartment being overcome, and the partition moves in a direction toward the end wall of the first compartment. The resulting movement of the stem causes the drain valve to open and discharge fluid. In turn the float falls and closes the gas inlet port so no more gas is fed to the second compartment. A bleed passage is provided from the second compartment to atmosphere to allow slow discharge of some gas from the compartment and to permit the return of the partition to its original position, closing the drain valve. This movement also closes the bleed passage and traps the remaining gas in the second compartment at a pressure slightly below system pressure, the difference preferably being of the order of three to five pounds per square inch. At this time, a force balance is achieved.

It will be seen that the mechanism briefly described above accomplishes several very desirable results. When all valves are closed, a force balance is maintained. As soon as the rising float opens the gas inlet valve the resulting increase in pressure in the second compartment from the additional gas immediately overcomes the force balance and the drain valve commences to open and discharge liquid. As will be explained hereinafter, there are several variables that are automatically accounted for to achieve a force balance, these variables occurring such as when the system starts up from rest, when bowl or container pressure varies during operations or when during dumping or discharging liquid there is excessive bleeding of gas pressure from the second compartment.

In a device of this kind, the differential unit pressure across the gas inlet port multiplied by the area of the port determines the force required to be exerted by the float to open the valve. Even though the port may be very small, if the pressure within the port is atmospheric the opening force required with a system pressure of 100 pounds per square inch or higher approaches poundage. This requires a large float and defeats any efforts to make a compact device.

However, with the present concept, in which the differential is maintained substantially at three to five pounds per square inch regardless of system pressure, the total opening force required is of the order of a fraction of an ounce. By selective design, the force can be reduced as low as desired but it is preferred to retain sufficient differentail to prevent undesired opening of the valve as a result of shock or vibration. The achievement of the low opening force presents the very desirable advantage that the float may be made as small as desired. The force balance of the servo unit likewise makes it possible to design that component as small as desired, with the result that the entire discharge mechanism may be of minimum size for its intended use.

Since the forces are all so closely balanced, the components may be made very light without affecting their durability. Moreover, the elements are so designed and arranged that when the system pressure is cut off both compartments go to atmospheric pressure and the drain valve opens and discharges substantially all of the remaining liquid. When the system is again pressurized the valve closes promptly.

While the majority of devices in accordance with the present invention are inserted in series in pressurized gas lines, they work in the same way and equally as well when installed at dead ends of such systems to collect and discharge various condensed liquids.

Various other advantages and features of novelty will become apparent as the description proceeds in conjunction with the accompanying drawing, in which:

FIGURE 3 is a top plan view of the retainer for the liquid outlet seal; and

FIGURE 4 is a top plan view of the guide for the bleed valve seat.

Figure 1:
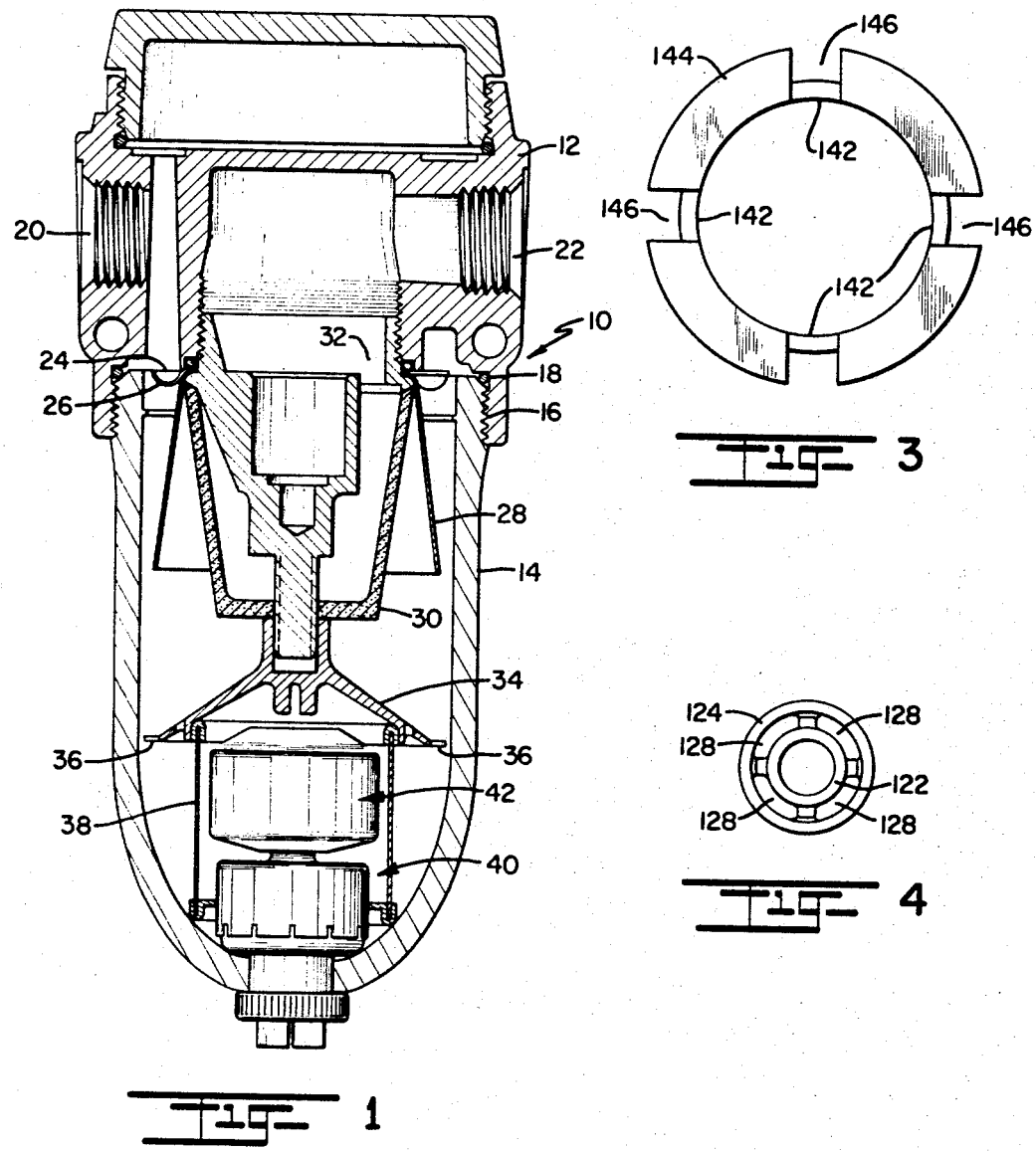
FIGURE 1 is a sectional view in elevation of a complete separator and automatic liquid discharge device adapted to be connected into a pressurized gas line.

The complete assembly 10 illustrated in FIGURE 1 includes a separator body 12 and a liquid container 14 secured thereto by screw threaded connection 16 and sealed by packing ring 18. Body 12 has an inlet port 20 and an outlet port 22 for connection to a conventional pressurized gas line. Gas enters port 20 and passes down into container 14 through flow direction 24 having vanes 26 which give the gas a rotary or helical motion which throws out liquid and solid contaminants against the wall of the container. The liquid gravitates to the bottom of the bowl and some of the solids flow down with it.

The gas is forced to flow down below the lower edge of the skirt or shield 28 before it can reverse its path, thence flowing upward through filter 30 and passage 32 to outlet port 22 and on into the continuation of the gas line. Filter 30 is very fine and serves to separate out practically all of the solid particles which were not removed by centrifugal action. A conical shield 34 spans the container at an intermediate point and is provided with a plurality of marginal cutouts 36 to permit passage of liquids and solid particles. It almost completely separates the upper and lower parts of the container, forming a "quiet" zone at the bottom, to prevent the gas from picking up any of the liquid which has accumulated in the lower part. A cylindrical screen 38 is snugly mounted between shield 34 and the bottom of the container to intercept solid particles which might be large enough to interfere with the action of servo 40, which is located entirely within the screen. An actuating float 42 is also located within the screen above servo 40.

Figure 2:
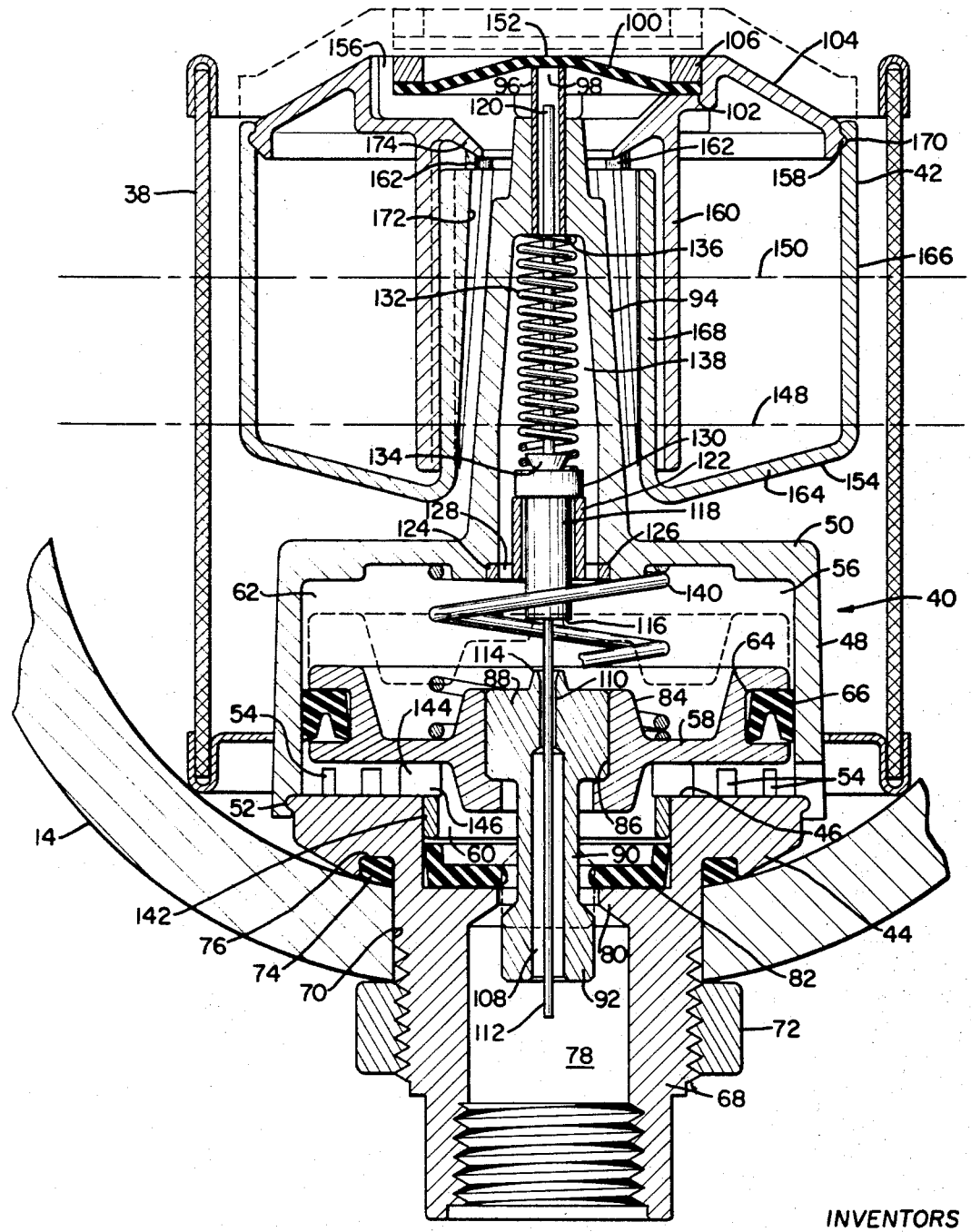
FIGURE 2 is a similar view on an enlarged scale of the float, servo, and drain valve of FIGURE 1.

The details of construction of servo 40 and its relation to float 42 are illustrated in FIGURE 2, where it will be seen that the unit includes a valve body having a base portion 44 providing a bottom or end wall 46. While the base portion and various other parts may have any desired cross sectional shape it is preferred to make most of the elements annular as shown. The valve body further includes a cup having a cylindrical side wall 48 and an end wall 50. The base and cup are made of a strong high quality plastic material. The lower free edge of the cup is provided with an internal annular groove 52 to fit over the margin of base 44 and is further provided with a plurality of annular slots 54 to facilitate snapping the cup in place. The slots have a further purpose as set forth below.

The cup and base combine to form an enclosed chamber 56, in which is located a partition 58. While the partition may be a flexible diaphragm having its margin secured to an intermediate section of side wall 48, the preferred form as shown is a piston slidable vertically in the chamber and dividing it into first and second or lower and upper compartments 60 and 62 respectively. The piston margin has an annular sealing groove 64 occupied by packing ring 66 to sealingly separate the two compartments. Base 44 is provided with a central, vertically depending, hollow boss 68 which extends through aperture 70 in the bottom wall of container 14 and is secured in position by retainer ring 72 which may be threaded thereon. The connection is made liquid pressure tight the use of packing ring 74 seated in groove 76.

The bore 78 of boss 68, which serves as the discharge path to waste for liquid accumulated in container 14, is formed with a restriction 80 forming a seat or shoulder for the sealing ring 82 which constitutes an annular valve seat. The enlarged central hub 84 of the partition 58 is formed with a shouldered bore 86 into which is firmly fitted the upper end 88 of a stem 90 which extends downwardly into bore 78 and is axially freely movable through valve seat 82. An enlargement 92 is formed on the lower portion of stem 90 and serves as a valve head, cooperating with valve seat 82 to form a liquid outlet valve which is opened and closed by movement of partition 58 in a vertical direction as viewed in FIGURE 2. While the valve may be designed and mounted for closing by either upward or downward movement, with various elements designed and arranged for proper cooperation, the arrangement shown is preferred to obtain better force balances and to facilitate the function of complete drainage on shutdown of the pressurized gas system, as will be made clear hereafter.

In addition to the function of facilitating the connection of cup 48, 50 to the margin of base 44, the radial slot or slots 54 serve the further and primary function of one or more liquid inlet ports to receive pressurized liquid from the container into the first, lower compartment 60. The liquid inlet port is open at all times so that there is always system pressure in compartment 60 acting against the adjacent wall of partition 58.

End wall 50 of the second, upper compartment 62 is centrally provided with an upwardly extending hollow mast 94 which is preferably somewhat conical as shown. A tube 96 extends a short distance from the upper end of the mast and terminates in gas inlet port 98. The tube and the hollow intermediate portion of the mast serve as a flow path connecting the gas inlet port to the interior of compartment 62 so that gas at system pressure may enter the compartment 62 to counterbalance to the desired extent the upward force of the liquid in lower compartment 60.

Float 42 carries at its upper end a cap, or valve, or seal for gas inlet port 98 in the form of a diaphragm 100 of flexible material secured at its margin in an annular depressed seat 102 of float cap 104 by a locking ring 106 which is press fitted in the side wall of seat 102. When the float rises with the level of the accumulated liquid it opens the gas inlet port 98, and permits additional gas at system pressure to flow through the tube 96 and the mast into compartment 62. When the float falls it closes the gas inlet port and prevents the inflow of any more gas to compartment 62. Further details of the float and valve construction and their mode of operation will be set forth hereinafter.

In order to provide for discharge of gas from compartment 62 on occasion, stem 90 is provided with an elongate axial bleed passage 108, which is highly restricted in its upper portion 110, and further restricted by actuating rod 112 which is only slightly smaller in cross sectional area than portion 110 to provide an annular passage of extremely small radial dimension. The upper end of the stem is formed as an annular valve seat 114 coaxially surrounding the bleed passage. A cooperating valve seat is provided by the lower end wall 116 of plug 118. The plug is preferably made of an elastomeric material such as Buna N and is bonded to actuating rod 112, the upper end 120 of which extends to a point within tube 96 just below the mouth of port 98.

The plug is carried for vertical sliding movement in a guide comprising a cylindrical sleeve 122 and an annular flange 124 mounted in seat 126 in end wall 50. The flange is provided with a plurality of passages 128 for the flow of gas from inlet port 98 to compartment 62. The top plan view of the guide is shown in FIGURE 4. The downward movement of the plug and the normal position of seat 116 are limited by contact of shoulder or flange 130 of the plug with the upper end of sleeve 122. The plug is yieldingly held in its lower position, as shown, by a backup spring 132 surrounding the actuating rod 112 and a projection 134 on the upper rear end of the plug and seated against the internal shoulder 136 at the upper end of passage 138 in the mast 94. The plug is moved upon occasion with rod 112 to manually open port 98 and is returned to the position shown by the action of spring 132. It is to be noted that, when the plug is in its position of rest, seat 116 is so located that it will be contacted by seat 114 slightly subsequent to the time that valve head 92 engages valve seat 82 in the manner shown by dotted lines in FIGURE 2.

In the preferred form of the invention it is desired to have a constantly acting yielding force exerted in a direction to open the fluid outlet valve. This is accomplished by providing a light spring 140 mounted in compression between the upper face of partition 58 and the end wall 50 of the second or upper compartment 62. The spring, acting through the partition, will yieldingly urge valve 92 downwardly toward an open position. It will be observed that the effective pressure area of the partition 58 in the upper compartment is greater than that in the lower compartment.

In order to prevent partition 58 from seating flatly on end face 46 and blocking exit of liquid, a multi-purpose retainer is provided. This retainer, as seen in FIGURES 2 and 3, comprises a radially thin cylindrical ring 142, which is press fitted into the upper part of the bore 78 of boss 68 to hold the sealing ring valve seat 82 in place, surmounted by an integral flange 144 which is cut away radially at spaced points around its periphery to form radial passages or ports 146. It will be seen that in addition to holding the valve seat in place the retainer also provides a limit stop for partition 58, and the ports 146 provide passage for fluid through compartment 60 into drainage bore 78.

When the system is idle and the line pressure is at or near atmospheric, the various parts of the mechanism are at rest in the positions shown. Valve 92 and the liquid outlet port are open and gas inlet port is closed by valve 100. When the line pressure goes up to the normal operating value container 14 become pressurized and pressure fluid, whether gas or liquid, enters the always open inlet ports 54 and exits through the discharge port. Since the latter is quite restricted, pressure builds up in compartment 60, overcoming the effect of spring 140 together with the difference in effective areas on opposite sides of the partition, raising the partition to the dotted line position shown in FIGURE 2. Since very little gas at atmospheric pressure bleeds out through passage 110 in this short space of time, practically all of the gas in compartment 62 is compressed and trapped by closure of valves 114, 116. At this time, valve 92 is also closed by movement of the partition and the container is now sealed.

It should be pointed out that when the system starts up from rest and pressure builds up in the container 14, or for that matter when bowl pressure increases during normal operation or if during dumping there is too much bleeding from compartment 62, the pressure of the gas trapped in chamber 62 plus the force of spring 140 may not be sufficient to balance the liquid pressure force in chamber 60. In this event, the partition will be forced up beyond the dotted line position shown, and valve seat 114 will force plug 118 upwardly. Valve head 92 does not prevent this action because valve seat 82 is so designed that its contacting edge will yield upwardly.

Plug 118 is raised sufficiently by the movement of partition 58 to bring the upper end 120 of rod 112 into contact with valve 100 and raise it off the mouth of port 98. This allows pressurized gas to enter the port and flow into chamber 62 until the forces are in balance, whereupon partition 58 will move down to neutral position and valve 100 will again close port 98.

In the course of operation, fluid is separated from the compressed gas and accumulates in the lower portion of container 14. When it reaches a first predetermined level, such as 150, FIGURE 2, the float has been raised high enough to lift valve 100 off the mouth of gas inlet port 98 and gas flows through tube 96 and passage 138 to compartment 62. When the unit pressure in this compartment has risen to a value approaching or substantially equal to system pressure, the total downward gas pressure plus the yielding force of spring 140 exceeds the resisting force or pressure of the liquid in compartment 60, and valve 92 opens to discharge liquid from the container.

Bleed passage 110 is, of course, open as long as the partition is in a valve opening position, and gas constantly discharges from compartment 62. However, the gas inlet port 98 and passage 138 are substantially larger so that adequate gas reaches the compartment to replace the discharge. When the float falls, port 98 is closed, cutting off the supply of additional gas but the bleed discharge continues. Consequently, the supply of gas in compartment 62 is gradually depleted and partition 58 moves upwardly, closing the bleed passage and the liquid outlet, and the drain cycle is completed. It will be apparent that the remaining gas trapped in compartment 62 plus the force of spring 140 is now in substantial balance with the force in compartment 60. Force balance will be sought and obtained and if necessary to achieve such following dumping, supplementary gas will automatically be obtained by partition being forced beyond the dotted line position shown, all as described above, to recover gas pressure after a dump. When the float next rises to open inlet 98 a sufficient increment of additional gas entering compartment 62 will increase the pressure in compartment 62 resulting in the drain valve again being opened. With the mechanism in such close balance, the valve is very sensitive to changes in liquid level and opens frequently for small, smoothly executed discharges which do not disturb the pressurized gas system. On the contrary, in unbalanced systems, the valves open abruptly and discharge large quantities of fluid which can cause disturbances in the system.

The balance, of course, includes the liquid pressure on valve 92. It will be seen that, with the construction and arrangement disclosed, the effective area of the valve is very small compared to that of the partition, and the opening force exerted by the valve is only about two percent of the force exerted upwardly on the partition by the pressurized fluid.

Since the compartment 62 retains gas at a pressure only slightly less than the system pressure, the fluid forces on the various parts of the servo are so small as to be negligible and consequently the parts can be made very small and light without danger of failure under operating conditions.

The presence of operating rod 112 in bleed passage 110 very effectively prevents blocking by any small solid particles which may accidentally enter compartment 62. Since the bleed passage is annular rather than a simple circle it is impossible for a small particle to block all of its flow area. Moreover, the bleed passage moves axially with respect to the rod during every drain cycle and the relative movement makes it self cleaning.

A very important result of the concept of maintaining gas pressure in compartment 62 only slightly less than system or container pressure, the differential being of the order of three to five pounds per square inch, is that the buoyant force of the float required to open the gas inlet valve is drastically reduced. It will be seen by reference to FIGURE 2 that the vertical forces on all parts of the float and valve except for the small portion overlying port 98 are exactly balanced because all such ports are exposed to system pressure. If the gas in compartment 62 were at atmospheric pressure, as in prior art devices, the differential pressure on top of the center of cap or valve 100 would be the unit pressure in the system times the area of port 98 including the end face of tube 96. A low pressures, such as 5 or 10 pounds per square inch, this is not a serious matter. However at high pressures, for example 100 pounds per square inch and up, a port area of as little as .00125 square inch would require a float lifting force of about two ounces or more, the force required going up directly with the unit pressure. The necessary float size completely rules out any possibility of making a small compact device for use with high pressure systems.

On the other hand, with the present concept and design, the differential pressure across the gas inlet port 98 can be maintained as low as desired and is preferably about three to five pounds per square inch, varying only slightly with variations in system pressure. Consequently, for any operating pressure a float can be utilized which is required to exert a lifting force of only an ounce or less such as about $\frac{1}{10}$ of an ounce with a port area of .00125. To repeat, the present invention thus results in the pressure in the second compartment 62 being automatically maintained at a predetermined gas pressure below that in bowl 14 regardless of the size (high or low) of the operating gas pressure within the bowl or, in other words, at any operating pressure.

The novel construction of valve 100 further reduces the unseating force required and would have particular utility in the unbalanced systems mentioned above. The valve is in the form of a disc of flexible and preferably elastic material such as Buna N and is gripped at its margin between seat 102 and ring 106. As seen in FIGURE 2 in its position of rest, its center part 152 overlies inlet 98 and the body assumes a slightly conical shape because of its elasticity and the weight of the float 42. When the float rises, the body assumes the reverse conical shape, with its margin higher than the center part 152 which is still held down by the differential pressure. The upward force of the float is now applied to the outermost edge of the center part because of the flexibility of the material and must overcome only a small fraction of the total differential force. The center part is therefore "peeled" off the mouth of the inlet port with a minimum of applied force.

The unique construction of float 42 eliminates the crushing differential pressure which would be applied to a sealed hollow body under high system pressures, guards quite effectively against the entry of unwanted liquid, and has a self purging action to discharge liquid which accidentally does enter. It is made up primarily of cap section 104 and cup section 154. Valve 100 is secured to the cap section as previously described, and the cap section is provided with one or more passages 156 to allow pressurized gas to enter readily under valve 100. Cap section 104 has a downwardly depending annular flange 158 at its outer margin and a downwardly depending cylindrical wall 160 spaced outwardly from its longitudinal axis. The inner surface of the wall is provided with a plurality of circumferentially spaced longitudinally extending spacing ribs 162.

Cup section 154 has a frusto-conical bottom wall 164 inclined upwardly and outwardly, an outer cylindrical wall 166 extending upwardly and an inner cylindrical wall 168 also extending upwardly. The upper end of wall 166 has an internal annular grooves 170 to snap over the beaded margin or flange 158 in sealing engagement. The inner surface of wall 168 is provided with a plurality of circumferentially spaced longitudinally extending ribs 172 which taper inwardly and upwardly. They allow liquid and gas to circulate freely between the float and the mast 94 and guide the float in its vertical movement, allowing a substantial amount of lateral play which does not interfere with control of inlet port 98 because any part of the central area of valve 100 will seal effectively.

Ribs 162 fit snugly against the outer surface of wall 168 and define a plurality of flow paths from the top of wall 168 to the bottom of wall 160 just above the juncture of walls 168 and 164, where a shallow annular passage leads to the interior of the float. Wall 160 is provided near its upper end with an inwardly extending annular lip 174 which protects the entrance to the interior of the float.

In operation, when pressurized gas enters the container it does not apply a crushing pressure to the float but enters its interior through the passages between walls 160 and 168 and equalizes the pressure across the walls so that there is no distorting or destructive force applied to the float at any time. Since the entrance is well above the fluid level, the entering gas has no tendency to carry any liquid in with it. If by mischance any liquid does enter the float, it will lie in the trough at the junction of walls 164 and 168 directly across the annular inlet where it will remain while the system is in operation. When the system is shut down and the pressure cut off, the pressurized gas within the float will flow out through the annular passage, pushing the liquid ahead of it and back into the container. Normally all but a few drops will be driven out and the float will again be ready for operation. Because of this self purging action the float will never become "waterlogged."

On occasion it may be desirable to actuate the fluid discharge manually. To accomplish this, it is only necessary to push upwardly on the actuating rod 112 which is readily available at the waste opening. The upper end 120 of the rod strikes valve 100 and raises it to open gas inlet valve 98, which allows gas to enter compartment 62 and actuate the mechanism in the manner described above. As soon as this action has started, the rod can be released. Since rod 112 is bonded to plug 118 it moves plug 118 upward against spring 132 during the opening action, and when rod 112 is released, it and the plug are promptly returned to their original position.

If the system pressure drops to any significant extent or if it is cut off entirely, the pressure in compartment 60 is lowered and the mechanism will open the valve and drain the liquid. If the pressure has been cut off the valve will remain open until the system is reactivated. On the other hand, if the pressure is merely reduced, the pressure in compartment 62 will bleed, once seats 114 and 116 are disengaged, until a new condition of equilibrium is reached, and the mechanism will operate in the same manner as before.

If the drain valve tends to stick in an open position because of a dirt particle or the like, it can of course drain out all the liquid and then leak pressurized gas. However, with the present construction such event is a practical impossibility because when compartment 62 bleeds to atmospheric pressure the upward force on the partition will be sufficient to break the valve loose and close it.

When the mechanism is designed for specific operating pressures it can be readily made to function without the use of a spring such as spring 140. The relative effective areas on the two sides of the partition can be varied, as by changing the diameter of the stem of head 92. The fluid pressure forces can also be so balanced that the weight of the partition, stem, and valve will furnish the unbalance to open the valve, since the device is normally used in the upright position shown. If desired, additional weights can be secured to the stem.

We claim:

1. An automatic drain system comprising, in combination with a service container for receiving liquid and compressed gas: a drain valve for said service container; sensing means for sensing the level of liquid in said service container; gas inlet valve means operated by said sensing means to control passage of gas at system pressure from said container; and a servomechanism actuated by differential pressure to operate said drain valve comprising: a housing; a reciprocable prime mover element movably mounted in said housing dividing said housing into upper and lower compartments and operative with its movement to actuate said drain valve; means providing open communication between said lower compartment and liquid in said service container and in fluid communication with the prime mover element; resilient means in said upper compartment urging said prime mover element downwardly in the direction of said lower compartment; means for conveying said compressed gas from said inlet valve means to said upper compartment to move said prime mover element downwardly to open said drain valve; and bleed means for bleeding compressed gas from said upper compartment at a rate less than that of incoming gas to permit said drain valve to close when said inlet valve means is closed.

2. The automatic drain system of claim 1 in combination with a compressed gas system having means for separating liquid and foreign material from the gas and depositing said separated liquid and foreign material in said service container.

3. The automatic drain system of claim 1 including means for operating said gas inlet valve means externally of said system.

4. The automatic drain system of claim 1 in which said inlet valve means includes a movable diaphragm valving element.

5. The automatic drain system of claim 1 including valving and blocking means for closing said bleed means and blocking the movement of said prime mover element in the direction of said upper compartment substantially simultaneously with the closing of said drain valve to trap gas in said upper compartment at a pressure between system pressure and that of the area to which said gas is being bled; whereby the pressure differential across said inlet valve means is reduced.

6. The automatic drain system of claim 5 in which said blocking and valving means comprises cooperating valve elements supported, respectively, by said prime mover means and in the opposed wall of said upper compartment at least one of said cooperating valve elements extending from its corresponding support into said upper compartment, said bleed means is a channel leading from said upper compartment through said prime mover element to the exterior of said system, said cooperating valve elements being operative to enter into sealing contact with each other substantially simultaneously with the closing of said drain valve, and said drain valve includes a flexible valve seat.

7. The automatic drain system of claim 1 in which said sensing means is a float.

8. The automatic drain system of claim 7 in which said float comprises: a lower hollow cup section open at the top and a circular cap section seated therein, said cup section comprising an outer cylindrical wall, an inner cylinder wall open at the top, a frusto-conical bottom wall connecting said other two walls, said circular cap section comprising a circular top, a cylindrical inner wall depending downwardly from said circular top forming a cylindrical inner well and surrounding and spaced apart from the inner cylindrical wall of said cup section and terminating short of the inner surface of said bottom wall, means for supporting said cap section over said cup section to provide a passageway for gas and liquid into the interior of said cup section extending over the top of said inner cylindrical wall of the cup section down between the inner cylindrical walls of cap and cup sections and under the bottom of the inner cylindrical wall of said cap section, and a circular diaphragm seated over the top of said cylindrical well.

9. An automatic drain system comprising: a service container for receiving liquid and compressed gas; a drain valve in said service container having a flexible seat; a liquid level responsive float in said service container; a diaphragm attached to said float; and a servomechanism actuated by differential pressure to operate said drain valve comprising; a housing; a reciprocable piston movably mounted in said housing dividing it into upper and lower compartments; a drain valve element attached to said piston cooperating with said valve seat to open and close said drain valve upon downward and upward movement, respectively, of said piston; passage means providing open communication between the liquid in said service container and said lower compartment and in fluid communication with said prime mover element; spring means in said upper compartment urging said piston downwardly in the direction of said lower compartment; a first channel for conveying said compressed gas at system pressure from said service container to said upper compartment to move said piston downwardly to open said drain valve; a gas inlet valve formed by said diaphragm and the upper end of said first channel; blocking and valving means in said upper compartment comprising upper and lower cooperating valve elements supported, respectively, by said piston and in the upper wall of said upper compartment, at least one of said cooperating valve elements extending from its corresponding support into said upper compartment; a second channel of lesser diameter than said first channel leading from said upper compartment through said piston to the exterior of said service container and servomechanism to bleed pressure from said upper compartment at a rate less than that of incoming gas, said valve elements operative to enter into sealing contact with each other substantially simultaneously with the closing of said drain valve to trap gas pressure in said upper compartment of a value between system pressure and that of the area to which the gas pressure is being bled; whereby the pressure differential across said gas inlet valve is reduced to permit a reduced size float.

10. The drain system of claim 9 including an actuating rod for said diaphragm extending from the exterior of said housing through said second channel and into proximity of said diaphragm.

11. A float device comprising a lower hollow cup section open at the top and a circular cap section seated therein, said cup section comprising an outer cylindrical wall, an inner cylindrical wall open at the top, a frustoconical bottom wall connecting said other two walls, said circular cap section comprising a circular top, a cylindrical inner wall depending downwardly from said circular top forming a cylindrical inner well and surrounding and spaced apart from the inner cylindrical wall of said cup section and terminating short of the inner surface of said bottom wall, and means for supporting said cap section over said cup section to provide a passageway for gas and liquid into the interior of said cup section extending over the top of said inner cylindrical wall of the cup section down between the inner cylindrical walls of cap and cup sections and under the bottom of the inner cylindrical wall of said cap section.

References Cited

UNITED STATES PATENTS

| | | | |
|---|---|---|---|
| 2,278,002 | 3/1942 | Thompson | 137—430 |
| 2,726,732 | 12/1955 | Faust et al. | 55—219 |
| 3,144,875 | 8/1964 | Goldtrap | 137—430 |
| 3,257,783 | 6/1966 | Baker et al. | 55—498 |
| 3,269,097 | 8/1966 | German | 55—337 |

HARRY B. THORNTON, *Primary Examiner.*

B. NOZICK, *Assistant Examiner.*

U.S. Cl. X.R.

55—337, 429; 137—195, 432